(12) United States Patent
Shi et al.

(10) Patent No.: US 10,860,715 B2
(45) Date of Patent: Dec. 8, 2020

(54) METHOD AND APPARATUS FOR PROACTIVELY IDENTIFYING AND MITIGATING MALWARE ATTACKS VIA HOSTED WEB ASSETS

(71) Applicant: BARRACUDA NETWORKS, INC., Campbell, CA (US)

(72) Inventors: Fleming M. Shi, Scotts Valley, CA (US); Nitzan Miron, San Francisco, CA (US)

(73) Assignee: Barracuda Networks, Inc., Campbell, CA (US)

( * ) Notice: Subject to any disclaimer, the term of this patent is extended or adjusted under 35 U.S.C. 154(b) by 265 days.

(21) Appl. No.: 15/600,511

(22) Filed: May 19, 2017

(65) Prior Publication Data

US 2017/0344743 A1    Nov. 30, 2017

Related U.S. Application Data

(60) Provisional application No. 62/342,152, filed on May 26, 2016.

(51) Int. Cl.
*H04L 29/06* (2006.01)
*G06F 21/56* (2013.01)
(Continued)

(52) U.S. Cl.
CPC ............ *G06F 21/563* (2013.01); *G06F 21/51* (2013.01); *G06F 21/577* (2013.01);
(Continued)

(58) Field of Classification Search
CPC ...... G06F 21/563; G06F 21/577; G06F 21/51; G06F 2221/033; G06F 21/56; H04L 63/1416; H04L 63/0245; H04L 63/1483
See application file for complete search history.

(56) References Cited

U.S. PATENT DOCUMENTS

| | | | |
|---|---|---|---|
| 6,567,918 B1 * | 5/2003 | Flynn | G06F 21/51 726/7 |
| 7,496,960 B1 * | 2/2009 | Chen | G06F 21/56 726/22 |

(Continued)

OTHER PUBLICATIONS

M. Fire, R. Goldschmidt and Y. Elovici, "Online Social Networks: Threats and Solutions," in IEEE Communications Surveys & Tutorials, vol. 16, No. 4, pp. 2019-2036, Fourthquarter 2014.*

*Primary Examiner* — David Garcia Cervetti

(57) ABSTRACT

A new approach is proposed that contemplates systems and methods to provide identification and mitigation of malware attack via Web assets hosted on a Web application, site, or platform in an automated and proactive manner. From the moment the Web assets are hosted on the Web application platform and protected by a Web application security device, the hosted Web assets are constantly monitored and assessed for potential risks. Whenever there is a new instance or a modification of a Web asset, a copy of the Web asset is automatically downloaded and analyzed for potential vulnerabilities. If a suspicious indicator of malicious contents in the Web asset is detected during the analysis, a plurality of security policies are created and applied to the Web application security device to mitigate threats of the Web asset and protect users of the Web application against malware attacks via the tampered Web asset.

29 Claims, 2 Drawing Sheets

(51) Int. Cl.
*G06F 21/51* (2013.01)
*G06F 21/57* (2013.01)
(52) U.S. Cl.
CPC ...... *H04L 63/0245* (2013.01); *H04L 63/1416* (2013.01); *G06F 21/56* (2013.01); *G06F 2221/033* (2013.01); *H04L 63/1483* (2013.01)

(56) References Cited

U.S. PATENT DOCUMENTS

| | | | | |
|---|---|---|---|---|
| 7,841,008 | B1* | 11/2010 | Cole | G06F 21/577 726/25 |
| 7,865,953 | B1* | 1/2011 | Hsieh | G06F 16/9566 726/22 |
| 8,201,257 | B1* | 6/2012 | Andres | G06F 21/568 726/25 |
| 8,505,094 | B1* | 8/2013 | Xuewen | H04L 63/1416 726/22 |
| 8,516,590 | B1* | 8/2013 | Ranadive | H04L 63/1483 726/24 |
| 8,800,040 | B1* | 8/2014 | Tan | H04L 63/145 726/24 |
| 8,898,272 | B1* | 11/2014 | Young | H04L 63/0407 709/223 |
| 8,984,640 | B1* | 3/2015 | Emigh | H04L 63/1441 726/25 |
| 9,043,894 | B1* | 5/2015 | Dennison | G06F 16/9535 726/11 |
| 9,118,714 | B1* | 8/2015 | Thomson | H04L 63/1433 |
| 9,172,712 | B2* | 10/2015 | Sheleheda | G06F 21/552 |
| 9,294,498 | B1* | 3/2016 | Yampolskiy | H04L 61/2007 |
| 9,405,736 | B1* | 8/2016 | Davison | G06F 16/972 |
| 9,436,838 | B2* | 9/2016 | Li | H04L 63/107 |
| 9,438,613 | B1* | 9/2016 | Paithane | H04L 63/168 |
| 9,635,039 | B1* | 4/2017 | Islam | H04L 63/1425 |
| 9,635,041 | B1* | 4/2017 | Warman | H04L 63/1416 |
| 9,912,718 | B1* | 3/2018 | Lepeska | H04L 67/2842 |
| 9,922,191 | B1* | 3/2018 | Grafi | G06F 21/564 |
| 10,057,279 | B1* | 8/2018 | Balduzzi | G06F 21/56 |
| 10,079,876 | B1* | 9/2018 | Chung | H04L 63/102 |
| 10,104,113 | B1* | 10/2018 | Stein | H04L 63/1433 |
| 2002/0095567 | A1* | 7/2002 | Royer | G06F 21/41 713/150 |
| 2002/0095605 | A1* | 7/2002 | Royer | H04L 67/16 726/7 |
| 2002/0133697 | A1* | 9/2002 | Royer | H04L 29/12594 713/150 |
| 2002/0135612 | A1* | 9/2002 | Royer | H04L 63/0428 715/741 |
| 2005/0028104 | A1* | 2/2005 | Apparao | G06F 16/437 715/738 |
| 2005/0172130 | A1* | 8/2005 | Roberts | G06T 1/005 713/176 |
| 2005/0187934 | A1* | 8/2005 | Motsinger | H04L 63/107 |
| 2005/0188079 | A1* | 8/2005 | Motsinger | H04L 63/1416 709/224 |
| 2005/0188080 | A1* | 8/2005 | Motsinger | H04L 67/22 709/224 |
| 2005/0188222 | A1* | 8/2005 | Motsinger | H04L 63/08 726/5 |
| 2005/0198099 | A1* | 9/2005 | Motsinger | G06F 21/55 709/200 |
| 2006/0015722 | A1* | 1/2006 | Rowan | H04L 9/3268 713/166 |
| 2006/0101120 | A1* | 5/2006 | Helsper | H04L 63/1483 709/206 |
| 2006/0272011 | A1* | 11/2006 | Ide | G06F 21/577 726/5 |
| 2007/0005367 | A1* | 1/2007 | DeJean | G07D 7/2033 704/273 |
| 2008/0010368 | A1* | 1/2008 | Hubbard | G06F 16/285 709/223 |
| 2008/0010683 | A1* | 1/2008 | Baddour | G06F 16/951 726/24 |
| 2008/0133540 | A1* | 6/2008 | Hubbard | H04L 63/1483 |
| 2009/0248696 | A1* | 10/2009 | Rowles | G06F 21/552 |
| 2009/0249482 | A1* | 10/2009 | Sarathy | H04L 63/1441 726/22 |
| 2009/0249484 | A1* | 10/2009 | Howard | H04L 63/145 726/24 |
| 2009/0300045 | A1* | 12/2009 | Chaudhry | G06F 21/552 |
| 2009/0328142 | A1* | 12/2009 | Wang | H04L 9/3247 726/2 |
| 2010/0083380 | A1* | 4/2010 | Harris | G06F 21/565 726/24 |
| 2010/0100743 | A1* | 4/2010 | Ali | H04L 9/3247 713/176 |
| 2010/0128918 | A1* | 5/2010 | MacWan | H04N 21/2402 382/100 |
| 2010/0229159 | A1* | 9/2010 | Odaira | G06F 9/449 717/128 |
| 2011/0040769 | A1* | 2/2011 | Tseng | G06F 16/951 707/750 |
| 2011/0185436 | A1* | 7/2011 | Koulinitch | H04L 63/1483 726/28 |
| 2011/0219448 | A1* | 9/2011 | Sreedharan | G06F 21/566 726/23 |
| 2011/0289582 | A1* | 11/2011 | Kejriwal | G06F 21/566 726/22 |
| 2011/0321160 | A1* | 12/2011 | Mohandas | G06F 21/56 726/22 |
| 2012/0011588 | A1* | 1/2012 | Milener | H04L 63/1425 726/24 |
| 2012/0023579 | A1* | 1/2012 | Zaitsev | G06F 21/56 726/23 |
| 2012/0124664 | A1* | 5/2012 | Stein | H04L 51/12 726/22 |
| 2012/0185859 | A1* | 7/2012 | Kashiwaya | G06F 9/3808 718/100 |
| 2012/0227112 | A1* | 9/2012 | Capasso | G06Q 30/00 726/29 |
| 2012/0311707 | A1* | 12/2012 | Provos | G06F 21/577 726/23 |
| 2012/0317642 | A1* | 12/2012 | Royal | H04L 63/1433 726/22 |
| 2013/0055369 | A1* | 2/2013 | Kumar | H04L 9/3247 726/7 |
| 2013/0067577 | A1* | 3/2013 | Turbin | G06F 21/56 726/24 |
| 2013/0074188 | A1* | 3/2013 | Giakouminakis | H04L 63/1433 726/25 |
| 2013/0074191 | A1* | 3/2013 | Ben-Reuven | G06F 21/6209 726/26 |
| 2013/0097706 | A1* | 4/2013 | Titonis | H04W 12/12 726/24 |
| 2013/0117854 | A1* | 5/2013 | Britton | G06F 21/81 726/24 |
| 2013/0205361 | A1* | 8/2013 | Narayanaswamy | H04L 63/1408 726/1 |
| 2013/0227636 | A1* | 8/2013 | Bettini | G06F 21/568 726/1 |
| 2013/0227683 | A1* | 8/2013 | Bettini | G06F 21/53 726/22 |
| 2013/0311906 | A1* | 11/2013 | Mackin | H04L 51/32 715/758 |
| 2013/0326620 | A1* | 12/2013 | Merza | H04L 63/1425 726/22 |
| 2013/0347094 | A1* | 12/2013 | Bettini | G06F 21/577 726/11 |
| 2014/0041029 | A1* | 2/2014 | Zhou | H04L 63/20 726/22 |
| 2014/0059649 | A1* | 2/2014 | Hu | H04L 63/1483 726/3 |
| 2014/0075564 | A1* | 3/2014 | Singla | H04L 63/1433 726/25 |
| 2014/0082726 | A1* | 3/2014 | Dreller | H04L 51/26 726/23 |
| 2014/0173730 | A1* | 6/2014 | Bejerasco | G06F 21/50 726/22 |

(56) References Cited

U.S. PATENT DOCUMENTS

| | | | |
|---|---|---|---|
| 2014/0173739 A1* | 6/2014 | Ahuja | H04L 63/1433 726/25 |
| 2014/0189069 A1* | 7/2014 | Gero | H04L 67/02 709/219 |
| 2014/0310807 A1* | 10/2014 | Qi | H04L 67/02 726/22 |
| 2014/0325662 A1* | 10/2014 | Foster | H04L 63/20 726/25 |
| 2014/0366143 A1* | 12/2014 | Sandler | G06F 21/51 726/25 |
| 2015/0012383 A1* | 1/2015 | Touboul | G06Q 30/0609 705/26.35 |
| 2015/0033342 A1* | 1/2015 | Zhang | G06F 21/563 726/23 |
| 2015/0066575 A1* | 3/2015 | Baikalov | G06Q 10/0635 705/7.28 |
| 2015/0067839 A1* | 3/2015 | Wardman | G06F 21/563 726/22 |
| 2015/0096023 A1* | 4/2015 | Mesdaq | G06F 21/566 726/23 |
| 2015/0237068 A1* | 8/2015 | Sandke | H04L 63/1425 726/23 |
| 2015/0261951 A1* | 9/2015 | Abuelsaad | G06F 21/554 726/22 |
| 2015/0261955 A1* | 9/2015 | Huang | G06F 21/562 726/23 |
| 2015/0326572 A1* | 11/2015 | Oyman | H04L 9/321 726/4 |
| 2015/0350205 A1* | 12/2015 | Oyman | H04L 65/602 726/7 |
| 2016/0036795 A1* | 2/2016 | Lietz | H04L 63/20 726/4 |
| 2016/0036816 A1* | 2/2016 | Srinivasan | H04L 61/1511 726/1 |
| 2016/0036833 A1* | 2/2016 | Ardeli | H04L 63/101 726/22 |
| 2016/0088015 A1* | 3/2016 | Sivan | H04L 29/08 726/23 |
| 2016/0112440 A1* | 4/2016 | Kolton | H04L 63/101 726/1 |
| 2016/0125185 A1* | 5/2016 | Wang | G06F 8/71 726/23 |
| 2016/0164915 A1* | 6/2016 | Cook | H04L 63/1483 726/1 |
| 2016/0173509 A1* | 6/2016 | Ray | H04L 63/1425 726/23 |
| 2016/0173510 A1* | 6/2016 | Harris | H04L 63/02 726/23 |
| 2016/0173525 A1* | 6/2016 | Thomas | H04L 63/145 726/23 |
| 2016/0248785 A1* | 8/2016 | Petry | H04L 63/0209 |
| 2016/0269433 A1* | 9/2016 | Jiang | H04L 63/10 |
| 2016/0277194 A1* | 9/2016 | Sun | H04L 9/3247 |
| 2016/0285914 A1* | 9/2016 | Singh | H04L 63/1416 |
| 2016/0294851 A1* | 10/2016 | Langton | H04L 43/0876 |
| 2016/0337379 A1* | 11/2016 | Godlewski | G06F 3/048 |
| 2016/0364567 A1* | 12/2016 | Akiyama | G06F 21/56 |
| 2016/0381058 A1* | 12/2016 | Antony | G06F 21/566 726/23 |
| 2017/0063920 A1* | 3/2017 | Thomas | H04L 63/1408 |
| 2017/0070460 A1* | 3/2017 | Bejerasco | H04L 51/12 |
| 2017/0180413 A1* | 6/2017 | Petry | H04L 63/123 |
| 2017/0223024 A1* | 8/2017 | Desai | H04L 63/0281 |
| 2017/0279831 A1* | 9/2017 | Di Pietro | H04L 63/0263 |
| 2018/0013789 A1* | 1/2018 | Damian | H04L 61/1511 |
| 2018/0077120 A1* | 3/2018 | Baughman | H04L 63/1408 |
| 2018/0097822 A1* | 4/2018 | Huang | G06F 21/562 |
| 2018/0109498 A1* | 4/2018 | Singh | H04L 67/02 |
| 2018/0115463 A1* | 4/2018 | Sinha | H04L 41/5067 |
| 2018/0124110 A1* | 5/2018 | Hunt | H04L 63/101 |
| 2018/0191765 A1* | 7/2018 | Cho | H04L 63/1433 |
| 2019/0014087 A1* | 1/2019 | Robinson | H04L 63/0272 |
| 2019/0075130 A1* | 3/2019 | Petry | H04L 63/1483 |
| 2019/0165997 A1* | 5/2019 | Shaikh | H04L 67/34 |
| 2019/0166013 A1* | 5/2019 | Shaikh | H04L 41/50 |
| 2019/0166037 A1* | 5/2019 | Shaikh | H03M 13/3761 |
| 2019/0173750 A1* | 6/2019 | Shaikh | H04L 63/20 |

* cited by examiner

METHOD AND APPARATUS FOR PROACTIVELY IDENTIFYING AND MITIGATING MALWARE ATTACKS VIA HOSTED WEB ASSETS

CROSS-REFERENCE TO RELATED APPLICATIONS

This application claims the benefit of U.S. Provisional Patent Application No. 62/342,152, filed May 26, 2016, and entitled "Method and apparatus for actively identifying and mitigating hosted Web assets against malware attacks," which is incorporated herein in its entirety by reference.

BACKGROUND

As the world is increasingly turning to web-based applications for not only e-commerce, but also business tools and entertainment purposes, Web assets hosted in, for non-limiting examples, traditional datacenters, private clouds, public clouds, and other form factors are rapidly growing. These Web assets range from documents to media files and executable files in full, partial or compressed form hosted by, for a non-limiting example, Web applications, sites, and/or platforms. For non-limiting examples, partial form of files can be but is not limited to a macro inside an office document, a JS linked by a HTML document, and a code section or snippet of a Lambda Deployment Package. As the popularity of the hosted Web assets grows, there is an increasing need to ensure all of the Web assets are trustworthy, authentic and tamper-free, as cyber criminals can utilize Web applications of the trusted Web assets to mount attacks against the users of these applications. If undetected and un-deterred, such attacks can easily penetrate and disrupt normal applications of the users.

In many cases, the Web application sites/platforms being attacked can be but are not limited to social networking sites, such as Facebook, Twitter, and Google+, where a large community of users can be affected when a document or URL on the Web site tampered by an attacker is shared among them. In order to stop the spoofed and/or malicious content from being distributed over the platforms and to protect the brands and reputation of the owners of the Web application platforms, it is desirable to be able to automatically scan all of the published Web assets on the platforms and actively provide preventative warning and mitigation if it is determined that such Web assets have been tampered as a result of malware attacks.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
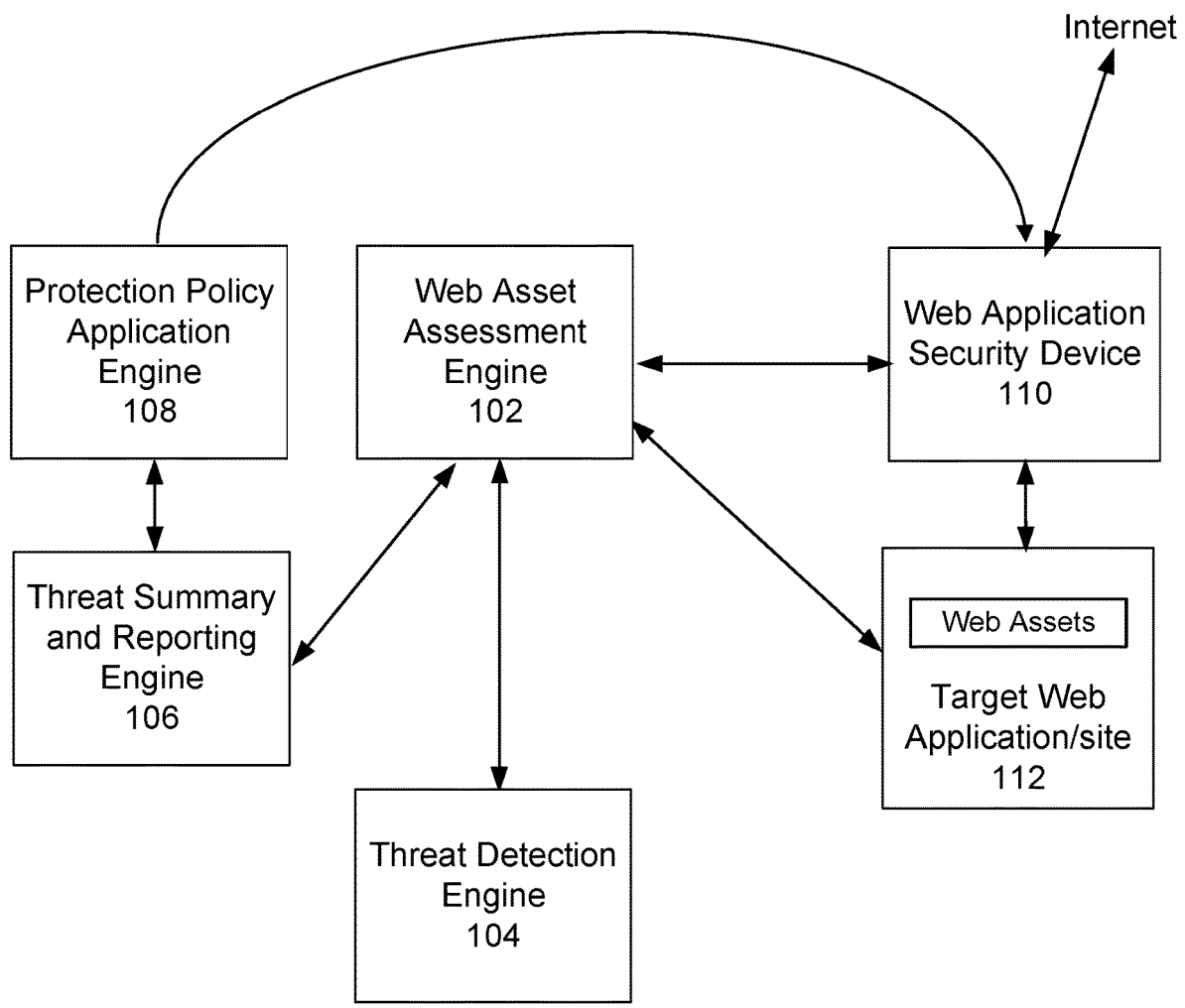
FIG. 1 depicts an example of a system diagram to support identification and mitigation of malware attack via hosted Web assets in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to provide identification and mitigation of malware attack via Web assets hosted on a Web application, site, or platform in an automated and proactive manner. Here, the Web assets can be but are not limited to URLs, document objects and executable programs. From the moment the Web assets are hosted on the Web application platform and protected by a Web application security device, such as a Web application firewall, the hosted Web assets are constantly monitored and assessed for potential risks. Whenever there is a new instance or a modification of a Web asset, a copy of the Web asset is automatically downloaded and analyzed for potential vulnerabilities. If a suspicious indicator of malicious contents in the Web asset is detected during the analysis, a plurality of security policies are created and applied to the Web application security device to mitigate threats of the Web asset and protect users of the Web application against malware attacks via the tampered Web asset.

Since the proposed approach is agentless, i.e., it does not require agents to be installed on the server(s) of the hosting Web applications/sites, it enables unsupervised self-servicing of attack prevention to provide maximum detection for the Web applications without human intervention. In addition, by automatically and proactively identifying and mitigating attacks via the hosted Web assets, the proposed approach can provide instantaneous protection for the Web applications without delay, which is vital for timing-critical Web applications.

FIG. 1 depicts an example of a system diagram 100 to support identification and mitigation of malware attack via hosted Web assets. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a Web asset assessment engine 102, a threat detection engine 104, a threat summary and reporting engine 106, and a protection policy application engine 108, each running on a computing unit/appliance/host/environment (not shown) having one or more processors and storage units. The engines include software instructions stored in a storage unit such as a non-volatile memory (also referred to as secondary memory) of the host for practicing one or more processes. When the software instructions are executed the processor of the host, at least a subset of the software instructions is loaded into memory (also referred to as primary memory) by one of the computing units, which becomes a special purposed one for practicing the processes. The processes may also be at least partially embodied in the host into which computer program code is loaded and/or executed, such that, the host becomes a special purpose computing unit for practicing the processes. When implemented on a general-purpose computing unit, the computer program code segments configure the computing unit to create specific logic circuits.

In the example of FIG. 1, each host can be a computing device, a communication device, a storage device, or any computing device capable of running a software component. For non-limiting examples, a computing device can be but is not limited to a laptop PC, a desktop PC, a tablet PC, or an x86 or ARM-based server running Linux or other operating systems. In some embodiments, each host has a communication interface, which enables the above engines running on the hosts to communicate with each other and with Web application security device 110 and/or target Web application or site 112 following certain communication protocols, such as TCP/IP, http, https, ftp, and sftp protocols, over one or more communication networks (not shown). The communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

In the example of FIG. 1, the Web asset assessment (WAA) engine 102 is configured to interact with a Web application security device 110 or a target Web application or site 112 protected by the Web application security device 110 to initiate an assessment of a Web asset hosted by the target Web application or site 112. As discussed above, the hosted Web asset can be but is not limited to a URL, a document object in the format of, e.g., Javascript, PDF, Microsoft Office document, or an executable program on the target Web application or site 112. In some embodiments, the Web application security device 110 is a Web application firewall configured to protect the Web assets hosted by the target Web application or site 112 from external security risks and attacks. In some embodiments, the Web application firewall is a separate component at the egress of a protected private network and in front of the target Web application or site 112 being protected as shown by the example of FIG. 1. In some alternative embodiments, however, the Web application firewall can be a software component running on the protected target Web application or site 112 itself. In some embodiments, the Web asset assessment engine 102 is configured to utilize its web-client capabilities to establish a communication channel with the target Web application or site 112, which hosts the Web asset, wherein the communication channel reaches the target Web application or site 112 either internally through the topology of the private network protected by the Web application firewall, or externally through the Web application firewall first. In some embodiments, the Web asset assessment engine 102 is event-driven, which initiates the assessment when a new Web asset is hosted on the target Web application or an existing Web asset has been modified. In some embodiments, the Web asset assessment engine 102 is timer-based, which periodically checks the target Web application or site 112 for any newly added/hosted Web asset(s) since the last check and initiates an assessment if any newly added/hosted Web asset(s) are found.

In the example of FIG. 1, the threat detection engine 104 is configured to detect and determine a measurement in the form of a risk level/score of a Web asset, e.g., a file or an URL. Specifically, the threat detection engine 104 is configured to perform qualitative and/or quantitative data analysis on the received Web asset to determine if the Web asset has been tampered with, e.g., including malicious contents and/or viruses that may adversely affect other hosted Web assets and/or computing resources of the target Web application or site 112, or client systems having downloaded the Web asset from the target Web application or site 112. In some embodiments, the threat detection engine 104 is configured to identify the malicious contents and/or viruses via one or more of examining certificate of the Web asset, generating an authenticating signature of the Web asset and comparing it with a referencing signature previously generated and embedded within the Web asset, and/or utilizing a knowledge base of known threats to determine the risk level of the Web asset. Here, the threat detection engine 104 may run on the same or a separate host from the Web asset assessment engine 102, the threat summary and reporting engine 106, and the protection policy application engine 108. In the case where the threat detection engine 104 runs on a separate host, it may be invoked by the Web asset assessment engine 102 via, for a non-limiting example, via one or more HTTP Application Program Interface (API) calls, wherein the Web asset to be assessed is passed to the threat detection engine 104, which in turn provides the risk score of the Web asset back to the Web asset assessment engine 102. Utilizing the API implementation for communication with Web asset assessment engine 102 enables the threat detection engine 104 to be scalable and capable of handling a large volume of threat detection requests within a short period of time.

In the example of FIG. 1, the threat summary and reporting (TSR) engine 106 is configured to generate a report that summarizes the threat posed by a Web asset once the Web asset has been evaluated by the threat detection engine 104 and a risk score has been generated for the Web asset. Here, the threat summary report includes quantified and/or qualified information of the risks and specific threats posed by the Web asset. If such information is over certain pre-determined threshold or meet certain criteria, it may automatically trigger the protection policy application engine 108 to start a mitigation process as discussed in details below. In some embodiments, the threat summary and reporting engine 106 is also configured to provide the report, upon request, to a user/system administrator of the target Web application or site 112 as part of a warning message that the Web asset hosted on the target Web application or site 112 may have been tampered and may affect other hosted Web assets and/or applications of the target Web application or site 112, or client systems having downloaded the Web asset from the target Web application or site 112. In some embodiments, the threat summary and reporting engine 106 is also configured to enable the user to define and specify the criteria and/or threshold used to trigger the threat mitigation process.

In the example of FIG. 1, the protection policy application (PPA) engine 108 is configured to create a plurality of policies to trigger a threat mitigation process for the Web application security device 110, e.g., a Web application firewall, to mitigate the infected/malicious Web assets according to the policies. Here, the policies are created based on the report from the threat summary and reporting engine 106 and may include filtering and mitigating rules with respect to the hosted Web assets on the target Web application or site 112 protected by the Web application security device 110. For a non-limiting example, if the threat/risk score of a Web asset is too high (e.g., beyond certain threshold), the protection policy application engine 108 may request the Web application security device 110 to block or remove the Web asset from the target Web application or site 112. In some embodiments, the protection policy application engine 108 has compatible protocol knowledge for communications with the Web application security device 110 and is configured to access and insert the policies the Web application security device 110 by invoking a trusted API of the Web application security device 110. In some embodiments, the trusted API is a RESTful API that uses HTTP requests to GET, PUT, POST and DELETE data, wherein REST stands for Representational state transfer for communication over the Internet.

Figure 2:
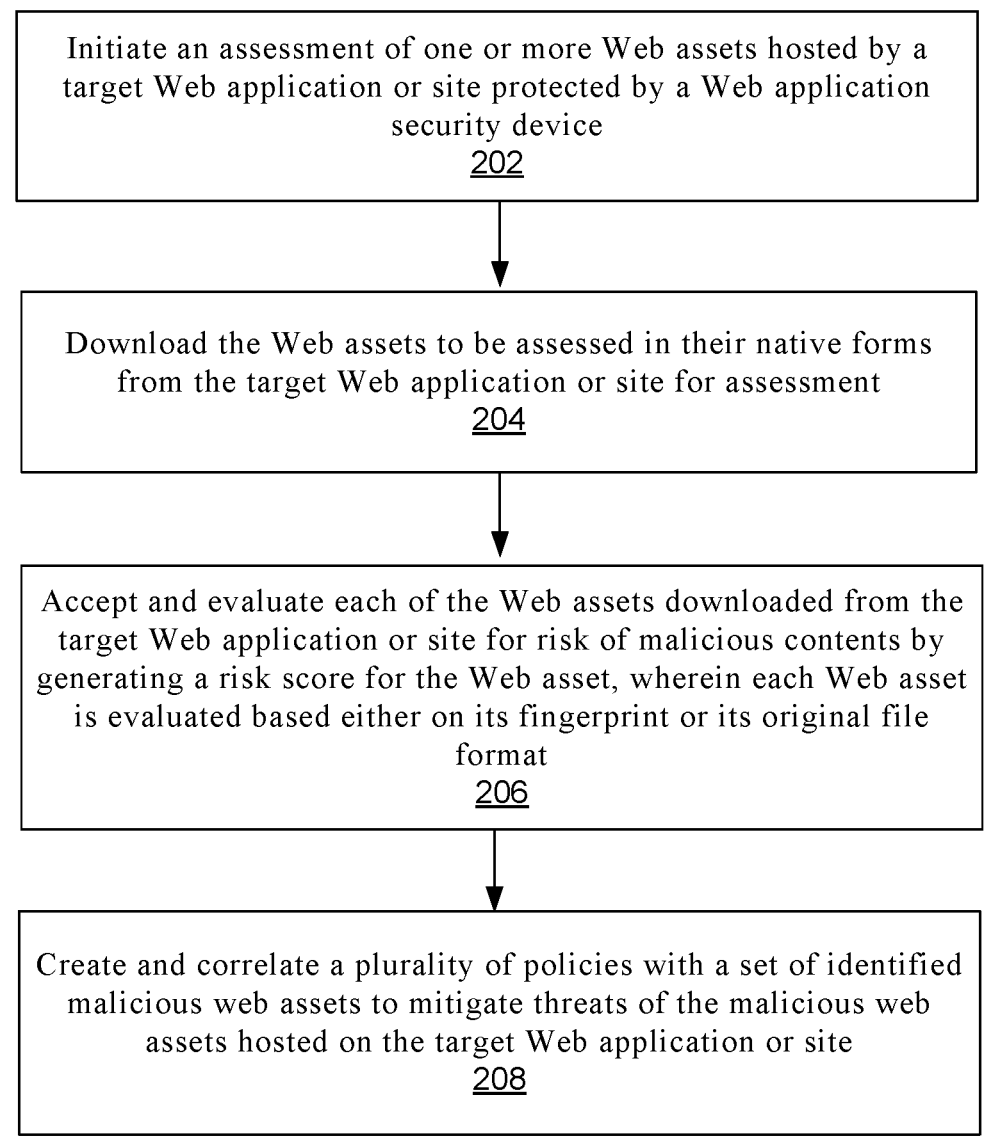
FIG. 2 depicts a flowchart of an example of a process to support identification and mitigation of malware attack via hosted Web assets in accordance with some embodiments.

FIG. 2 depicts a flowchart 200 of an example of a process to support identification and mitigation of malware attack via hosted Web assets. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where the Web asset assessment engine 102 first initiates an assessment of one or more Web assets hosted by the target Web application or site 112. In some embodiments, as the Web asset assessment engine 102 scans through the Web assets, it is configured to track newly hosted Web assets and changes to the existing Web assets. As such, subsequent scans can be done incrementally to pick only those Web assets that are new or have changed since the last scan for assessment. In some embodiments, the Web asset assessment engine 102 is configured to mark each Web asset to be assessed with contextual meta-data to indicate a path to the Web asset on the target Web application or site 112 for retrieval.

The flowchart 200 of the example of FIG. 2 continues to block 204, where the Web asset assessment engine 102 downloads the Web assets to be assessed in their native forms from the target Web application or site 112 for assessment. Here, the Web asset assessment engine 102 may either download the Web assets to be assessed iteratively one Web asset at time or download all of the Web assets in a batch to reduce connection overhead over the communication channel between the Web asset assessment engine 102 and the target Web application or site 112. After the Web assets have been downloaded, they are provided by the Web asset assessment engine 102 to the threat detection engine 104 for evaluation.

The flowchart 200 of the example of FIG. 2 continues to block 206, where the threat detection engine 104 evaluates each of the Web assets downloaded from the target Web application or site 112 for risk of malicious contents, wherein each Web asset is evaluated based either on its fingerprint or its original file format. Here, the threat detection engine 104 may communicate with the Web asset assessment engine 102 either synchronously wherein each Web asset is evaluated by the threat detection engine 104 as soon as it is downloaded from the target Web application or site 112, or asynchronously wherein the downloaded Web asset is first saved and maintained by the Web asset assessment engine 102 and is evaluated by the threat detection engine 104 at a later time depending on the availability of the communication channel between the two and/or the computing resources of the threat detection engine 104. Once the risk evaluation of the Web asset is done, the threat detection engine 104 is configured to provide the risk level/score of the Web asset is provided back to the Web asset assessment engine 102, which synchronizes the risk score with the corresponding Web asset it maintains. In some embodiments, the risk score is further provided to the threat summary and reporting engine 106, which generates a report that summarizes the threat posed by the Web asset as discussed above.

The flowchart 200 of the example of FIG. 2 ends at block 208, where the protection policy application engine 108 creates and correlates a plurality of policies with a set of identified malicious Web assets and inserts the policies to the Web application security device 110 to mitigate threats of the Web assets from the target Web application or site 112. Here, the policies would prevent access to the infected/malicious Web assets or block/remove them from the target Web application or site 112 in order to protect users of the applications and other hosted Web assets, and the reputation/integrity of the target Web application or site 112.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support identification and mitigation of malware attack via hosted Web assets, comprising:
   a Web asset assessment engine configured to
      initiate an assessment of a Web asset from one or more Web assets hosted by a target Web application or site protected by a Web application security device, wherein each of the Web assets is a URL or a document object, and wherein the assessment is initiated responsive to detecting that the Web asset is being added or modified on the target Web application or site protected by the Web application security device;
      download only the Web asset to be assessed in its native form from the target Web application or site for assessment over a communication channel;
   a threat detection engine configured to
      accept and evaluate the Web asset downloaded from the target Web application or site for risk of malicious contents by generating a risk score for the Web asset to the target Web application or site, wherein the Web asset is evaluated by generating an authenticating signature of the Web asset and comparing it to a referencing signature that was previously generated and embedded within the Web asset;
      identify a set of one or more malicious Web assets hosted on the target Web application or site based on their risk scores to the target Web application or site;
   a protection policy application engine configured to create and correlate a plurality of policies with the set of one or more identified malicious Web assets to mitigate threats of the malicious Web assets hosted on the target Web application or site.

2. The system of claim 1, wherein:
the target Web application or site is a social networking site where a community of users are affected when the malicious Web assets are shared by the users of the target Web application or site.

3. The system of claim 1, wherein:
the Web application security device is a Web application firewall configured to protect the Web assets hosted by the target Web application or site.

4. The system of claim 1, wherein:
the Web asset assessment engine is configured to utilize its web-client capabilities to establish a communication channel with the target Web application or site, wherein the communication channel reaches the target Web application or site either internally through a private network protected by the Web application security device or externally through the Web application security device.

5. The system of claim 1, wherein:
the Web asset assessment engine is configured to scan through the Web assets to track newly hosted Web assets and changes to the existing Web assets to incrementally pick only those Web assets that are new or have changed since the last scan for assessment.

6. The system of claim 5, wherein:
the Web asset assessment engine is event-driven, which initiates the assessment when the new Web asset is hosted on the target Web application or an existing Web asset has been modified.

7. The system of claim 1, wherein:
the Web asset assessment engine is timer-based, which periodically checks the target Web application or site for any newly hosted Web asset since the last check and initiates the assessment if any newly hosted Web asset is found.

8. The system of claim 1, wherein:
the Web asset assessment engine is configured to mark each Web asset to be assessed with contextual metadata to indicate a path to the Web asset on the target Web application or site for retrieval.

9. The system of claim 1, wherein:
the Web asset assessment engine is configured to download all of the Web assets to be assessed in a batch to reduce communication overhead between the Web asset assessment engine and the target Web application or site.

10. The system of claim 1, wherein:
the threat detection engine is configured to perform qualitative and/or quantitative data analysis on the Web asset to determine if the Web asset has been tampered with the malicious contents.

11. The system of claim 1, wherein:
the threat detection engine is configured to communicate with the Web asset assessment engine synchronously wherein each Web asset is evaluated as soon as it is downloaded from the target Web application or site.

12. The system of claim 1, wherein:
the threat detection engine is configured to communicate with the Web asset assessment engine asynchronously wherein each downloaded Web asset is first saved and maintained before it is evaluated at a later time.

13. The system of claim 12, wherein:
the threat detection engine is configured to provide the risk score of the Web asset back to the Web asset assessment engine to be synchronized with the corresponding Web asset it maintains.

14. The system of claim 1, wherein:
the protection policy application engine is configured to insert the policies to the Web application security device to prevent access to, block or remove the malicious Web assets from the target Web application or site to protect users of applications and other hosted Web assets of the target Web application or site or a client system having downloaded the Web asset from the target Web application or site.

15. The system of claim 1, further comprising:
a threat summary and reporting engine running on a host and configured to generate a report that summarizes threat posed by the Web assets based on the risk scores that have been generated for the Web assets.

16. The system of claim 15, wherein:
the protection policy application engine is configured to provide the report, upon request, to a user/system administrator of the target Web application or site as part of a warning message that the Web asset hosted on the target Web application or site has been tampered and may affect other hosted Web assets and/or applications of the target Web application or site or a client system having downloaded the Web asset from the target Web application or site.

17. A computer-implemented method to support identification and mitigation of malware attack via hosted Web assets, comprising:
- initiating an assessment of a Web asset from one or more Web assets hosted by a target Web application or site protected by a Web application security device, wherein each of the Web assets is a URL or a document object, and wherein the assessment is initiated responsive to detecting that the Web asset is being added or modified on the target Web application or site protected by the Web application security device;
- downloading only the Web asset to be assessed in its native form from the target Web application or site for assessment over a communication channel;
- accepting and evaluating the Web asset downloaded from the target Web application or site for risk of malicious contents by generating a risk score for the Web asset to the target Web application or site, wherein the Web asset is evaluated by generating an authenticating signature of the Web asset and comparing it to a referencing signature that was previously generated and embedded within the Web asset;
- identifying a set of one or more malicious Web assets hosted on the target Web application or site based on their risk scores to the target Web application or site;
- creating and correlating a plurality of policies with the set of one or more identified malicious Web assets to mitigate threats of the malicious Web assets hosted on the target Web application or site.

18. The method of claim 17, further comprising:
establishing a communication channel with the target Web application or site, wherein the communication channel reaches the target Web application or site either internally through a private network protected by the Web application security device or externally through the Web application security device.

19. The method of claim 17, further comprising:
scanning through the Web assets to track newly hosted Web assets and changes to the existing Web assets to incrementally pick only those Web assets that are new or have changed since the last scan for assessment.

20. The method of claim 17, further comprising:
periodically checking the target Web application or site for any newly hosted Web asset since the last check and initiating the assessment if any newly hosted Web asset is found.

21. The method of claim 17, further comprising:
marking each Web asset to be assessed with contextual meta-data to indicate a path to the Web asset on the target Web application or site for retrieval.

22. The method of claim 17, further comprising:
downloading all of the Web assets to be assessed in a batch to reduce communication overhead between the Web asset assessment engine and the target Web application or site.

23. The method of claim 17, further comprising:
performing qualitative and/or quantitative data analysis on the Web asset to determine if the Web asset has been tampered with the malicious contents.

24. The method of claim 17, further comprising:
communicating with the Web asset assessment engine synchronously wherein each Web asset is evaluated as soon as it is downloaded from the target Web application or site.

25. The method of claim 17, further comprising:
communicating with the Web asset assessment engine asynchronously wherein each downloaded Web asset is first saved and maintained before it is evaluated at a later time;
providing the risk score of the Web asset back to the Web asset assessment engine to be synchronized with the corresponding Web asset it maintains.

26. The method of claim 17, further comprising:
inserting the policies to the Web application security device to prevent access to, block or remove the malicious Web assets from the target Web application or site to protect users of applications and other hosted Web assets of the target Web application or site or a client system having downloaded the Web asset from the target Web application or site.

27. The method of claim 17, further comprising:
generating a report that summarizes threat posed by the Web assets based on the risk scores that have been generated for the Web assets.

28. The method of claim 27, further comprising:
providing the report, upon request, to a user/system administrator of the target Web application or site as part of a warning message that the Web asset hosted on the target Web application or site has been tampered and may affect other hosted Web assets and/or applications of the target Web application or site or a client system having downloaded the Web asset from the target Web application or site.

29. At least one computer-readable storage medium having computer-executable instructions embodied thereon, wherein, when executed by at least one processor, the computer-executable instructions cause the at least one processor to:
- initiate an assessment of a Web asset from one or more Web assets hosted by a target Web application or site protected by a Web application security device, wherein each of the Web assets is a URL or a document object, and wherein the assessment is initiated responsive to detecting that the Web asset is being added or modified on the target Web application or site protected by the Web application security device;
- download only the Web asset to be assessed in its native form from the target Web application or site for assessment over a communication channel;
- accept and evaluate the Web asset downloaded from the target Web application or site for risk of malicious contents by generating a risk score for the Web asset to the target Web application or site, wherein the Web asset is evaluated by generating an authenticating signature of the Web asset and comparing it to a referencing signature that was previously generated and embedded within the Web asset;
- identify a set of one or more malicious Web assets hosted on the target Web application or site based on their risk scores to the target Web application or site;
- create and correlate a plurality of policies with the set of one or more identified malicious Web assets to mitigate threats of the malicious Web assets hosted on the target Web application or site.

* * * * *